Nov. 10, 1964 T. H. BENZINGER 3,156,117
CLINICAL EAR THERMOMETER
Filed Sept. 21, 1961 2 Sheets-Sheet 1

Theodor H. Benzinger
INVENTOR.

BY *M Shrogo*
Attorney

Nov. 10, 1964   T. H. BENZINGER   3,156,117
CLINICAL EAR THERMOMETER
Filed Sept. 21, 1961   2 Sheets-Sheet 2

Theodor H. Benzinger
INVENTOR.
BY
Attorney

United States Patent Office 3,156,117
Patented Nov. 10, 1964

3,156,117
CLINICAL EAR THERMOMETER
Theodor H. Benzinger, Holly Oaks, Tilden Lane, Rockville, Md.
Filed Sept. 21, 1961, Ser. No. 139,812
17 Claims. (Cl. 73—359)
(Granted under Title 35, U.S. Code (1952), sec. 266)

The invention described herein may be manufactured and used by or for the Government of the United States of America for governmental purposes without the payment of any royalties thereon or therefor.

The present invention relates generally to apparatus for and methods of measuring internal body temperatures for diagnostic and research purposes and, more particularly, to a precision clinical thermometer for measuring cranial internal temperature at a site which is close to the sensory end organ at which the human or animal body "takes" it own temperature for thermoregulatory purposes.

In applicant's copending application, Serial No. 851,202, filed November 5, 1959, now Patent No. 3,054,397, there is set forth a brief discussion of the thermoregulatory function of the hypothalamus, an area at the base of the brain stem just above the crossing of the optic nerves. In the biological servomechanism system that prevents overheating of the body in a hot environment, the hypothalamus performs as the sensory-receptor organ. It registers the physical quantity that is to be regulated, namely, the internal body temperature and generates nerve impulses commensurate with the magnitude of this stimulus. The effector organs that act in response to these impulses to maintain the body temperature steady, despite warm environmental changes, are the cutaneous sweat glands and the peripheral blood vessels.

It has been experimentally determined that the nervous impulses that initiate the autonomic activity of the sweat glands and the dilation of the peripheral vessels for warm environment control originate, not in the receptor endings in the skin, but in the hypothalamus area mentioned above. The absence of thermoregulatory warm impulses from the skin to this heat control center is reported in applicant's publication appearing in the April 1961 issue of the "Annals of Internal Medicine," volume 54, No. 4. The article is entitled, "The Quantitative Mechanism and the Sensory-Receptor Organ of Human Temperature Control in Warm Environments." In one particular test, the subject was exposed to drastic differences in skin temperature. However, no meaningful relationship was observed between this temperature and the rate of sweating, the plot of the subject's heat dissipation by sweating versus skin temperature yielding a senseless graph. But when the same measurements of sweating were plotted against internal head temperature, as measured at the tympanic site, and inseparable and reproducible relationship appeared. The curve exhibited a sharply defined change of slope at 36.9° C. This point of departure may be thought of as the set point of the human thermostat in the particlar subject at the time of the experiment. A mere 0.01° C. rise in temperature from this breakoff point was sufficient to increase the dissipation of heat through sweating by one calorie per second and to raise the blood flow through the skin by 15 milliliters per minute. Also, skin and internal temperatures were widely dissociated by arbitrary changes of conditions, and the above relationship remained unaffected.

In order to provide a meaningful measure of the internal body temperature, a site as close as feasible to the hypothalamus heat center should, therefore, be chosen. Applicant's copending application suggests that the tympanic membrane can serve as this location, especially since it can be conveniently reached via the external auditory canal. Measurements at this membrane have been verified as essentially representing cerebral and, therefore, hypothalamus temperatures by simultaneous measurements made at other intercranial locations. For example, thermocouples were implanted (a) at the anterior outer wall of the sphenoid sinus; (b) at the base of the skull in the anterior ethmoidal region; (c) in the naso-pharyngal recess of Rosenmueller for comparison with a thermocouple placed (d) at the tympanic membrane. The first two of these locations, (a) and (b), it would be mentioned, are supplied with blood from the internal carotid artery by way of the opthalmic and ethmoidal branches. In location (c) of the thermocouple sat near the stem of the internal carotid artery. Temperatures at (a), (b) and (c) were found to be practically identical. The qualitative changes of temperature observed at (b), (c) and (d) after ingestion of ice by the subject were also in good agreement. The only difference found with site (d) was a less rapid response, which can be explained on the basis of the slower circulation through bone and cartilage. The reading at (d) was always the highest, however, regardless of environmental temperature. This difference arises because of the evaporating cooling that takes place at the wet surfaces of sites (a), (b) and (c).

It is accordingly a primary object of the present invention to provide a clinical ear thermometer which can be retained in place within the external auditory canal so as to measure the internal temperature of a man or animal in health and disease.

A still further object of the present invention is to provide a clinical ear thermometer which can be inserted into the external auditory canal so as to contact intimately and continuously the tympanic membrane.

A still further object of the present invention is to provide a clinical ear thermometer and cooperating ear-frame attachment for measuring the temperature at the tympanic membrane.

A yet still further object of the present invention is to provide an ear-frame for a clinical ear thermometer which maintains the temperature sensing element thereof in intimate contact with the tympanic membrane.

A yet still further object of the present invention is to provide a brushlike attachment for permitting a patient to wear comfortably an electrical ear thermometer in his external auditory canal.

A further object of the present invention is to provide a simple and inexpensive ear thermometer mounting means which prevents the thermosensitive element from being dislodged by movement of the patient.

A yet still further object of the present invention is to provide means for maintaining a clinical ear thermometer within the auditory canal of a patient with the contact between the active elements of the thermometer and the site being measured persisting even in the presence of movement by the patient.

The clinical ear thermometer disclosed in the above copending application is in one form essentially a simple thermocouple constructed of extremely fine, thermo-electrically different conductors. These conductors are retained within a thin-wall, flexible, tubular member which has electrical insulation properties. To avoid any possible injury to the sensitive membrane, the tubular member is folded back upon itself to form a terminal loop; in this way a soft curvature, not a pointed end, touches the tender tympanic membrane. The stiffness of the probe is selected so that no appreciable force or pressure in excess of five grams can be transmitted therealong without it bending or buckling. Besides providing protection, this loop also serves to locate precisely the temperature-sensitive junction which is of a relatively small dimension. A tubular member, rather than an applied coating, is resorted to for insulating the conductors because of the extremely small radius of the loop. In other words, the danger is always present that when these conductors are sharply bent any insulation directly applied thereto may peel off and thereby expose the electrical conductors to the tympanic membrane. The resulting electrical short-circuiting with the mass of the body would disturb the measurement.

For proper operation of the clinical thermometer, it is, of course, mandatory that the thermojunction be maintained in intimate contact with the tympanic membrane throughout the measurement. Any dislocation therefrom, no matter how small, will destroy the usefulness of the data. To safeguard against this, the above copending application recommends that some sort of an ear frame be attached to the head of the patient. Once this frame is secured in place, the external part of the ear is manipulated so as to straighten out the auditory canal whereby the safe introduction of the instrument is insured. Normally, the tubing is carefully inserted until the patient reports tenderness or an alteration of hearing. When either of these reactions occur, the tubing is secured to the ear frame by means of a suitable adhesive.

Briefly and in somewhat general terms, the objects of invention enumerated above are achieved by employing the combination of an ear thermometer, such as the one disclosed in the above-identified application, and either an external or internal supporting device for retaining it within the auditory canal with the temperature-sensitive portion thereof in contact with the tympanic membrane. The thermocouple probe is again constructed of extremely fine thermoelectrically different wires which are housed within a thin, flexible sheath-tubing which possesses electrical insulation characteristics. A softly curved ending, like the loop in the above-identified application, for example, is formed at one end for fixing the location of the minute thermosensitive junction, and the blunt end of this loop prevents damage to the tympanic membrane when the instrument is being placed in its operating position.

In one embodiment of the invention, the external supporting device comprises an ear frame supported by the ear lobe. This frame carries a cross arm which extends over the ear canal. The sheath-tubing passes through an alignment aperture in this arm and proceeds into the auditory canal. When contact is established between the loop and the tympanic membrane, adhesive means is applied to the crosspiece to lock the sheath in place.

Instead of securing the tubular sheath to an external frame, the present invention, in an alternative form, attaches a retaining element immediately adjacent to the thermosensitive junction. This attachment cooperates with the walls of the auditory canal to maintain the thermometer in place. Because of the proximity between this attachment and the loop, the instrument is secured to the patient at a position fairly close to the tympanic membrane, a condition which promotes proper operation of the thermometer. Furthermore, the configuration of the retaining element is such that any movement by the patient tends to cause both it and the thermocouple to which it is affixed to move downwardly along the auditory canal towards the membrane. This insures continuous contact between the ear thermometer and the membrane and prevents any discontinuities in the temperature measurements.

In one preferred embodiment, this internal retaining element consists of a brush-type bundle of soft bristles. This bundle has generally a narrow-shaped appearance which is achieved by securing each of the bristles at one end thereof to the tubular sheath by an adhesive or any equivalent retaining means. In another embodiment, the bristles, instead of being concentrated at one site, are fastened at an acute angle to the sheath over that portion thereof which normally enters the auditory canal. In still another alternative construction, the internal retainer takes the form of a wire wound in a spiral or expanding helix. The resiliency of this wire duplicates the action of the bristles and releasably retains the ear thermometer in its proper orientation. In another construction, an ear plug made of a deformable, rubbery material is inserted in the auditory canal and provided with a central aperture which is occupied by an insulating sleeve. The tubular sheaths pass through this sleeve and extend beyond it for a relatively short distance. Once the loop is brought in contact with the tympanic membrane, a wedge is inserted within the sleeve to lock the thermocouple in place.

Other objects and many of the attendant advantages of this invention will be readily appreciated as the same becomes better understood by reference to the following detailed description when considered in connection with the accompanying drawings wherein.

Figure 1:
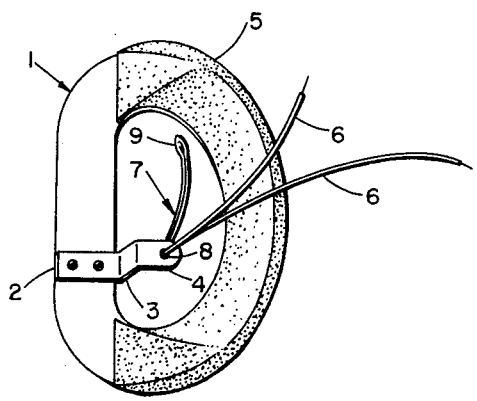
FIG. 1 depicts one form of an external supporting device for maintaining the thermoelectric probe in its proper operating position.

Referring now to FIG. 1 of the drawings, which schematically illustrates one type of external retaining device for maintaining the ear thermometer in place, a substantially D-shaped ear frame, intended to be worn on the left ear of the subject or patient, is generally represented by reference character 1. A crossarm 2, having a vertically offset portion 3, is secured to the upstanding portion of the D-shaped frame so that its end portion 4 terminates in line with the entrance to the auditory canal of the patient when the latter's ear lobe is pulled through the hole in the central portion of the frame. A wedge-shaped, foam rubber upholstering 5 is applied to the curved portion of the ear frame to contact in a comfortable manner the backside of the patient's ear lobe.

The sheath-tubing 6 of a thermoelectric probe 7 of the type previously described passes through an alignment aperture 8 in the terminal portion 4 of crossarm 3. This sheath-tubing, as stated hereinbefore, is carefully fed through the aperture until the blunt end of loop 9 contacts the tympanic membrane. When this occurs, an adhesive material, not shown, is applied to end portion 4 to fill aperture 8 and effectively fasten the temperature-sensitive thermojunction in place.

The employment of such an external structure to insure that the thermojunction remains in contact with the tympanic membrane, while generally satisfactory, does not, perhaps, constitute the best solution for this aspect of the temperature measuring operation. One reason for this is that movement of the patient's head may disturb the finite contact that exists between the arcuated portion of the loop and the membrane. Another reason is that fine adjustments cannot be made very easily because of the uncertain behavior of the adhesive when it is first applied to seal the thermocouple in place. Also, the point of attachment of the thermometer to the patient is, in effect, relatively remote from the site being measured. The presence of an intervening section of flexible, tubular sheathing permits the thermojunction to wander off the membrane. Moreover, the ear frame is relatively bulky and uncomfortable to wear.

Figure 2:
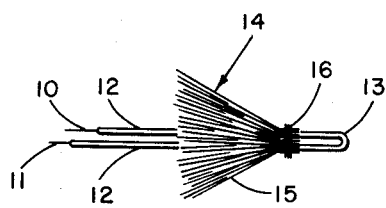
FIG. 2 illustrates a fundamental form of an internal retaining element for a clinical ear thermometer.
Figure 7:
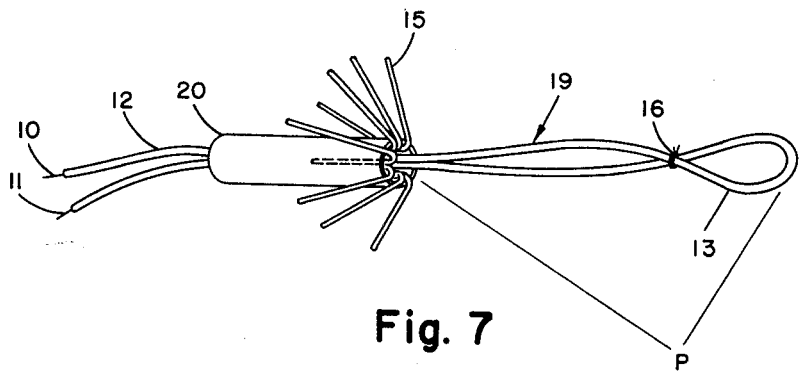
FIG. 7 shows a construction, distorted for illustration purposes, wherein the bristle retaining element also serves as the probe insertion means.

FIG. 2 of the drawings schematically illustrates a device which serves as an internal supporting structure for maintaining the ear thermometer probe in place. In this modification, electrical conductors 10 and 11 of different thermoelectric substances, such as, for example, copper and constantan, are disposed within an insulating sheath-tubing element 12 which is bent back on itself so as to form a terminal loop 13. Prior to their insertion, these conductors are secured together, end to end or side by side, as best shown in FIG. 7, to form a thermoelectric junction. The particular manner in which such a junction can be fashioned from two thermoelectrically dissimilar metals is, of course, well known in the art and, consequently, no further elaboration upon this aspect of the apparatus is deemed necessary. By either manipulating conductors 10 and 11 or by carefully folding tubular element 12, the thermojunction is positioned at loop 13 to form a thermoelectric probe.

One attachment for maintaining this probe in position within the auditory canal, which is generally represented by reference character 14, consists of a multiplicity or bundle of bristles 15 which are bound together at one end and secured to the folded sheath-tubing 12 via fastening means 16. This gives the bundle the appearance of an arrow head or cone with the apex pointing towards the thermojunction.

Figure 3:
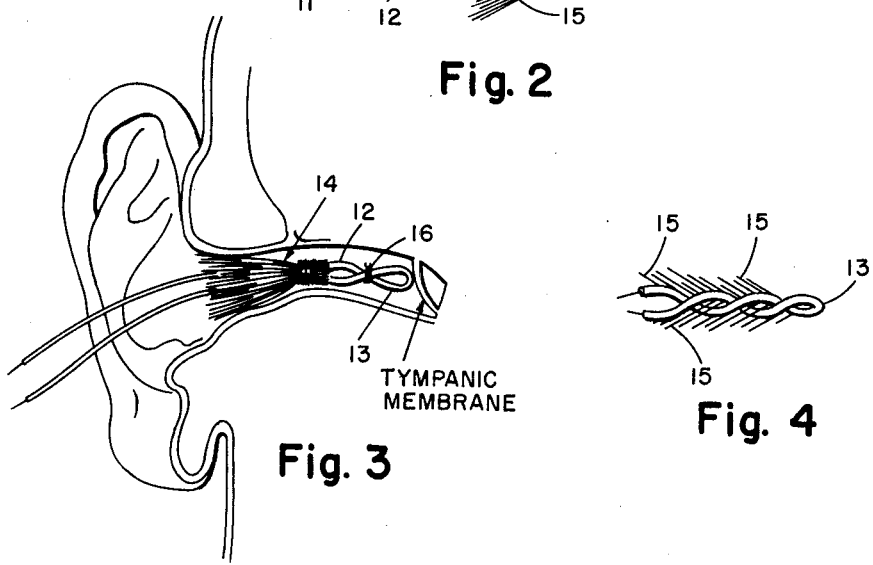
FIG. 3 illustrates the apparatus of FIG. 2 in its operating position with the sensitive end of the probe magnified to show the position of the thermojunction within the tubular sheath.

The manner in which this apparatus cooperates with the external auditory canal to hold the thermoelectric junction in contact with the tympanic membrane is schematically depicted in FIG. 3 which is a distorted illustration of the patient's right ear. In its operating position, the brushlike plug 14 fits within the outer ear with the free ends of the individual bristles 7 contacting the inner wall surface of the canal over a complete circumferential distance. In this showing, the loop end 13 of the thermometer is held in place by a strand of thread 16. However, as illustrated in FIG. 2, a length of adhesive tape, thread or a small rubber band can be employed both to secure the bristles in place and to form the loop portion of the thermometer.

In one practical construction, the bristles were one-quarter of an inch to one-half an inch long and conductors 10 and 11 were of 36-gauge copper and constantan. The sheath-tubing was of a clear plastic material, the transparency of which facilitated the proper positioning of the thermojunction. It had a 0.011 inside diameter and a 0.024 outside diameter, which dimensions gave the apparatus the proper stiffness.

It would be pointed out in connection with the above apparatus that the individual elements forming the brush or plug can be fashioned from a wide variety of substances and that the bristles described above are merely one preferred composition. What is important is that each of the individual elements be flexible and capable of being bent or otherwise deformed to conform to the adjacent inner surface of the auditory canal so that the thermometer is held firmly but releasably in place. Of course, they should not be made of a material which would render the retraction of the clinical ear thermometer difficult or injurious to the sensitive surfaces of the ear canal. For example, these elements may be made of artificial fibers a swell as natural fibers, rubber, and the like.

Figure 4:
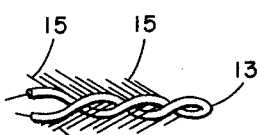
FIG. 4 illustrates an alternative attachment for a clinical ear thermometer.

Instead of concentrating the bristles at one particular point, these bristles, as shown in FIG. 4, may be distributed over the entire portion of the sheath which normally resides within the auditory canal. This canal is approximately one and one-eighth inches long. It would be pointed out that the bristles should not be numerous enough to stiffen the probe so that damaging forces may be transmitted to the membrane. The individual bristles can be fastened to the sheath-tubing by any adhesive substance.

Figure 5:
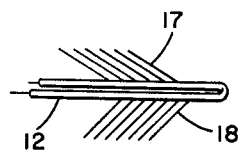
FIG. 5 shows another form of an attachment for an ear thermometer which is accommodated within the auditory canal.

In an alternative form, the bristles, as shown in FIG. 5, can be fashioned into two or more vanes, such as 17 and 18, symmetrically spaced around the circumference of the folded sheath-tubing 12. It would be pointed out at this time that, instead of folding the sheath-tubing to form the probe, a single sheath-tubing, closed off at one end, may be used to house the thermocouple. Of course, with such an arrangement, the individual conductors would have suitable insulating coatings applied thereto to prevent shorting. Vanes 17 and 18, it will be appreciated, behave in a manner similar to the bristle bundle of FIG. 2 to releasably maintain the ear probe in position.

Figure 6:
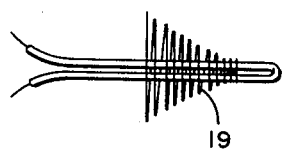
FIG. 6 shows another modification of an internal retaining means for an ear thermometer.

FIG. 6 illustrates a modification wherein the internal retaining element is in the form of a spiral or expanding helix 19 made of wire, plastic or any other suitable material. This spiral is made sufficiently resilient so that the last few turns thereof can conform to the ear canal when the ear thermometer is inserted in place. It would be noted at this time that any geometrical shape, such as a cone, which has an apex and a tapered portion emanating therefrom, can be employed in the construction of the internal retaining means. An attachment having this general configuration, as mentioned hereinbefore, tends to move in the direction towards which the apex is pointing, so to speak, when disturbed. Consequently, any relative movement between the ear canal and those portions of the retainer which touch it improved the contact between the thermojunction probe and the tympanic membrane.

An alternative construction, wherein the bristle retaining element also serves as a convenient means for inserting the probe P in place, is depicted in FIG. 7. In this arrangement, a portion of the sheath-tubing 12 which is adjacent the probe section 19 is disposed within a sleeve 20. The individual bristles 15 are inserted into the annular space between the sheath-tubing and the inner wall of this sleeve, extending therein for a distance approximately half their length, and where they emerge from the right-hand end of this sleeve, as viewed in this figure, they are bent at an angle of approximately 45° with respect to the latter's longitudinal axis of symmetry. The inner diameter of sleeve 20 is selected so that the clearance between the inner wall thereof and the outer walls of the sheath-tubing is sufficient to accommodate enough bristles about the sleeve's peripheral edge to duplicate the behavior of the bundle of bristles shown in FIG. 2, for example. It will be recognized that the bristles and sleeve coact to lock each other in place with respect to the sheath-tubing.

It will be readily appreciated that sleeve 20 can be made from a wide variety of different materials including those having deformable properties. Thus, if a metallic substance is used, for example, the sleeve or selected portions thereof can be simply crimped against the sheath-tubing to lock both it and the bristles in place at the desired location.

In one practical embodiment of the device shown in FIG. 7, sleeve 20 was made of a relatively stiff, moderately flexible, plastic tube, approximately five-eighths of an inch long with an inside diameter of 0.047 inch, an outside diameter of 0.067 inch and a wall thickness of 0.01 inch. The length dimension of sleeve 20 was kept much shorter than the length of the auditory canal, thereby obviating any danger of the right-hand end of this member being forced into contact with the tympanic membrane by someone applying pressure to the other end thereof in an effort to insert the probe in place. Since sleeve 20 cannot contact the membrane, it can be made rigid enough to serve as a convenient means for initially inserting the probe in place.

In the above embodiment, the bristles were approximately three-sixteenths to five-sixteenths of an inch long and their diameters varied from 0.005 inch to 0.010 inch. The loop 13 had a diameter of approximately one-sixteenth of an inch to one-eighth of an inch and housed a thermojunction formed by soldered copper and constantan wires of 36 gauge. The polyethylene sheath-tubing had an inside diameter of 0.009 inch, an outside diameter of 0.020 inch, and a wall thickness of 0.005 inch. Both the sheath-tubing and the sleeve were manufactured by Clay Adams Company and identified as No. PE, 10 stretched and No. PE, 190, respectively. With such a design it was found that the maximum pressure that could be applied to the area of touch before buckling of the probe was five grams.

Figure 8:
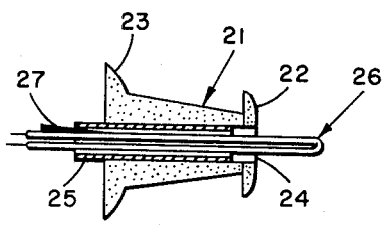
FIG. 8 illustrates the use of an ear plug for holding a clinical ear thermometer in its proper position.

In FIG. 8 there is depicted an arrangement wherein the retaining element for the thermoelectric probe includes an ear plug 21 made of a deformable material, such as a soft grade of neoprene. The forward and backward parts of this ear plug are provided with thin, flexible, skirtlike projections 22 and 23, respectively, which engage the inner portions of the outer ear canal when the apparatus is initially inserted. The ear plug has a central aperture 24 which accommodates a rigid sleeve 25 which is cemented or otherwise retained in place. In the operation of this apparatus, ear plug 21 is first inserted into the subject's auditory canal. Thereafter, the thermoelectric probe 26 is carefully pushed through sleeve 25 until contact is made with the membrane. Next, a wedge 27 is inserted between the sheath-tubing and the inner wall surface of sleeve 25 to lock the probe in place.

In the operation of the clinical ear thermometers fitted with retainers of the types shown in FIGS. 2, 4, 5, 6 and 7, the sheath-tubing is inserted until the patient reports tenderness or alteration in hearing. Either of these reactions indicates that contact has been made with the tympanic membrane. Nothing further need be done once these sensations are experienced, since the attachments are self-acting to retain the thermojunctions in their operating positions. If desired, of course, the sheath-tubing, where it passes close to the neck or the jaw of the patient, can be temporarily attached thereto by an adhesive material, or the like, to safeguard against any dislodgment of the ear thermometer by accidental disturbances to the sheath-tubing in those remote portions thereof which connect to the electrical measuring apparatus.

For monitoring or otherwise recording the patient's temperature, any conventional D.C. voltage measuring technique can be employed to indicate the output of the thermocouple. This output represents the difference of temperature between the eardrum-thermocouple and its "reference junction" at the other end of the thermoelectric circuit. Therefore, in the thermoelectric application of the invention, it is necessary to measure or to control the temperature of the reference junction. If the reference junction is continuously controlled to a certain value, say 37.00° C., the eardrum temperature may be directly read from a properly calibrated galvanometer, the zero point of which means 37.00° C. An alternative method is to warm or cool the temperature of the reference junction until the galvanometer reading is zero. The reading of temperature of the reference junction with a conventional thermometer accommodated in one metal block is a reading of the eardrum temperature as soon as warming or cooling of the metal block has resulted in zero reading of the galvanometer. In order to maintain the measuring apparatus in a standby condition ready for instant service, this block may be kept at about 37° C. by any conventional temperature regulating apparatus.

Instead of employing a thermocouple as the temperature sensing membrane, the temperature a the tympanic membrane can be ascertained, for example, by means of a thermistor bead having soft lead wires. Because of the substantially spherical configuration of the bead, this element is as innocuous as the thermocouple loop previously described. Likewise, its relatively fine lead wires provide the desirable impediment to the transmisison of appreciable or damaging pressures to the membrane. Such thermistors, as is well known, when calibrated and connected in a Wheatstone bridge configuration made up the temperature independent resistors, will give a reading of absolute temperature and, consequently, there is no necessity of resorting to a measured or controlled reference point.

The temperature sensing element, of course, can take other forms besides the two mentioned hereinbefore. For example, any detector which has a physical characteristic that varies with temperature can be substituted for the thermoelectric apparatus mentioned. Of course, in selecting the temperature-sensitive probe design, consideration should be given to the necessity of protecting the tympanic membrane against excessive external pressures. Moreover, with the advent of miniaturized solid-state amplifiers and extremely small potential sources, the complete signal amplifying and temperature recording apparatus may be affixed to the external ear frame of FIG. 1 as an appendage thereto.

Obviously many modifications and variations of the present invention are possible in the light of the above teachings. It is therefore to be understood that within the scope of the appended claims the invention may be practiced otherwise than as specifically described.

What is claimed is:

1. A clinical ear thermometer comprising, in combination, a length of flexible tubing, means for maintaining said tubing folded back upon itself so as to form a closed loop at a point intermediate the ends thereof, a thermosensitive element disposed within said tubing and positioned at the bend of said loop and means secured to said flexible tubing and cooperating with the ear canal of an individual whose temperature is being measured for releasably retaining said bend in contact with the latter's tympanic membrane.

2. In an arrangement as defined in claim 1, wherein said means secured to said flexible tubing and cooperating with the ear canal of the individual whose temperature is being measured comprises a cone-shaped bundle of bristles, the apex portion of which is fastened about two adjacent circumferential portions of said flexible tubing.

3. In an arrangement as defined in claim 1, wherein said means secured to said flexible tubing and cooperating with the ear canal of the individual whose temperature is being measured comprises a spiral member wound about said flexible tubing, said member being made of a flexible material whereby the last few turns thereof can conform to the inner surface of the ear canal.

4. In an arrangement as defined in claim 1, wherein said means secured to said flexible tubing and cooperating with the ear canal of the individual whose temperature is being measured comprises a plurality of vanes of flexible fibers attached to spaced circumferential portions of said flexible tubing.

5. A clinical ear thermometer comprising, in combination a flexible, tubular element, said element being folded back upon itself so as to include a U-shaped bend, means for securing opposite sides of said U-shaped bend together to form a closed loop, a thermosensitive element disposed within said tubing and positioned at the bend of said loop loop and means for releasably retaining said tubular element within the auditory canal of an individual whose temperature is being measured with the bend of said loop contacting the latter's tympanic membrane.

6. A clinical ear thermometer comprising, in combination, a length of flexible tubing, means for maintaining said tubing folded back upon itself whereby a U-shaped bend is formed at a point intermediate the ends of said tubing, a thermosensitive element, said thermosensitive element being positioned in said tubing at that point of said U-shaped bend where the direction of said tubing reverses whereby a thermosensitive probe is formed with said U-shaped bend serving as a blunt temperature sensor and flexible bristles secured to two adjacent surfaces of said tubing for releasably holding said probe within the auditory canal of an individual whose temperature is being measured with said blunt temperature sensor in contact with the latter's tympanic membrane.

7. A clinical ear thermometer comprising, in combination a length of flexible tubing, means for maintaining said flexible tubing folded back upon itself whereby a closed loop is formed at a point intermediate the ends of said tubing, a thermosensitive element disposed within said tubing and positioned so as to measure the temperature of an object against which the end of said loop is placed and a multiplicity of flexible bristles fastened about two adjacent circumferential portions of said tubing, said bristles cooperating with the internal surfaces of the ear canal of an individual whose temperature is being measured whereby said loop is releasably retained in contact with the latter's tympanic membrane.

8. A clinical ear thermometer comprising, in combination, a length of flexible tubing, means for maintaining said tubing folded back upon itself whereby a loop is formed at a point intermediate the ends of said tubing, a temperature-sensing element disposed within said tubing and positioned so as to measure the temperature of an object against which said loop is placed, a plurality of flexible fibers secured about the folded tubing at a point adjacent said loop for releasably retaining said loop in contact with the tympanic membrane of an individual whose temperature is being measured, each fiber being secured at one end whereby the other end can make contact with the internal surface of the latter's ear canal.

9. A clinical ear thermometer comprising, in combination, a flexible tubular member, said tubular member being folded back upon itself so as to have a loop portion and an adjacent double tubular portion, a thermosensitive element positioned within said tubular member and located at the bend of said loop portion and a deformable, cone-shaped member secured to said double tubular portion with the apex thereof pointing in the direction of said loop, said deformable member cooperating with the inner surface of the auditory canal of an individual to releasably retain the bend of said loop portion in contact with the latter's tympanic membrane.

10. A clinical ear thermometer comprising, in combination, a flexible, tubular member, means for fastening two intermediate points of said tubular member together to form a loop portion intermediate the ends of said tubular member, a thermojunction disposed within said tubular member and positioned at the bend of said loop, a plurality of thin, flexible elements, each element being secured at one end thereof to different points about the circumference of two adjacent portions of said tubular element, and means positioned within said tubular member at the bend of said loop for indicating the temperature of an object in contact with the bend of said loop.

11. A clinical ear thermometer comprising, in combination, a flexible, tubular member, said member being folded back upon itself so as to have a loop portion and an adjacent section where two lengths of said tubular member are in juxtaposition, a thermosensitive element disposed within said tubular member at the bend of said loop, a cone of flexible fibers, the apex portion of said cone surrounding and being secured to said adjacent section, said cone pointing in the direction of said loop portion and the length of said fibers being such that the free ends thereof can contact and conform to the inner surface of the auditory canal of an individual whose internal temperature is to be measured.

12. A clinical ear thermometer comprising, in combination, a sleeve, a flexible, tubular member, said member passing through said sleeve in a first direction, then being bent in a loop and then passing through said sleeve in an opposite direction, a multiplicity of bristles, said bristles extending beneath said sleeve at that end thereof which confronts said loop and being bent back at an acute angle with respect to the longitudinal axis of symmetry of said sleeve where they emerge from said sleeve, said bristles being spaced about the peripheral edge of said sleeve so as to be capable of resiliently contacting the inner surface of the auditory canal of an individual and a thermosensitive element positioned within said flexible, tubular member and located at the bend of said loop.

13. A clinical ear thermometer comprising, in combination, a sleeve, said sleeve having a length shorter than the length of the average auditory canal of a human being, a flexible tube, said tube passing through said sleeve in a first direction, then being bent in a U-shaped bend and then passing through said sleeve in an opposite direction, means for fastening opposite sides of said U-shaped bend together to form a closed loop, means positioned within said tube at the bend of said closed loop for sensing the temperature of an object in contact with the outer surface of said bend, a plurality of bristles, each bristle having a portion thereof which extends under said sleeve at that end thereof which faces said U-shaped bend and being bent backwardly at an acute angle with respect to the longitudinal axis of symmetry of said sleeve at the point where it emerges from said sleeve, each bristle being spaced at different points about the circumference of said sleeve, whereby the free ends of said bristles can contact and conform to the inner surface of the auditory canal of a person whose internal temperature is being measured.

14. A clinical ear thermometer comprising, in combination, a flexible probe having a thermal sensitive element in an end portion thereof, the stiffness of said probe being such that buckling of said probe occurs whenever an appreciable compressive force is applied thereto and means for releasably retaining said probe within the auditory canal of an individual whose temperature is being measured with said end portion thereof in thermal contact with the latter's tympanic membrane.

15. A clinical ear thermometer comprising, in combination, a flexible probe having a temperature-sensitive detector positioned in an end portion thereof, said probe having a stiffness such that said end portion can only exert a limited amount of pressure on the tympanic membrane of an individual whose temperature is being measured before buckling of said probe occurs, whereby injury to said membrane during the insertion of said probe is prevented, and deformable means secured to said probe and adapted to cooperate with the inner wall surface of the auditory canal of said individual for releasably retaining said end portion of said probe in intimate thermal contact with said tympanic membrane.

16. A clinical ear thermometer comprising, in combination, a flexible tubular element, a loop formed in said tubular element, a temperature-sensitive element positioned at the bend of said loop and forming with said tubular element a thermal-sensitive probe, the stiffness of said tubular element being such that when said probe is inserted into the auditory canal of an individual whose temperature is to be measured and the bend of said loop brought in contact with the tympanic membrane of said individual, any excessive force applied to said probe to place said bend in the above position causes a buckling of said tubular element whereby damage to said tympanic membrane is prevented and means secured to said tubular element and adapted to cooperate with the inner wall surface of said auditory canal for releasably retaining the bend of said loop in contact with said tympanic membrane.

17. A clinical ear thermometer comprising, in combination, a flexible tubular element, said tubular element being folded back upon itself so as to form a terminal loop, a temperature-sensitive element disposed within said tubular element and positioned at the bend of said loop, the stiffness of said flexible tubular element being such that any excessive force applied to said tubular element to place the bend of said loop in thermal contact with the tympanic membrane of an individual whose temperature is being measured results in a buckling of said tubular element whereby damage to said tympanic membrane is precluded and deformable means secured to said tubular element and adapted to cooperate with the inner wall surface of the auditory canal of said individual for releasably retaining the bend of said loop in contact with said tympanic membrane.

References Cited in the file of this patent

UNITED STATES PATENTS

| | | |
|---|---|---|
| 774,282 | Smith | Nov. 8, 1904 |
| 2,012,112 | States | Aug. 20, 1935 |
| 2,487,038 | Baum | Nov. 8, 1949 |
| 2,728,832 | Hoffman | Dec. 27, 1955 |

FOREIGN PATENTS

| | | |
|---|---|---|
| 874,650 | Great Britain | Aug. 16, 1961 |